June 29, 1965  MASAO NAKAMURA  3,191,224
FLEXIBILIZING RIGID FOAMS

Original Filed May 31, 1962  3 Sheets-Sheet 1

INVENTOR.
Masao Nakamura
BY
Robert B. Ingraham
AGENT

June 29, 1965  MASAO NAKAMURA  3,191,224
FLEXIBILIZING RIGID FOAMS

Original Filed May 31, 1962  3 Sheets-Sheet 2

INVENTOR.
Masao Nakamura
BY Robert A. Ingraham
AGENT

INVENTOR.
Masao Nakamura
BY
AGENT

United States Patent Office 3,191,224
Patented June 29, 1965

3,191,224
FLEXIBILIZING RIGID FOAMS
Masao Nakamura, Midland, Mich., assignor to The Dow Chemical Company, Midland, Mich., a corporation of Delaware
Original application May 31, 1962, Ser. No. 198,824. Divided and this application Jan. 2, 1964, Ser. No. 344,154
4 Claims. (Cl. 18—1)

This application is a division of Serial Number 198,824, filed May 31, 1962.

This invention relates to a method and apparatus for the flexibilizing of rigid plastic foam, and more particularly relates to a ethod and apparatus which will confer directional flexibility on rigid plastic foams.

The term "directional flexibility" refers to the property of materials to bend in one direction or about any one of a number of parallel lines disposed in a plane. Typically, a number of wooden boards in closely adjacent relationship and having a hinge between each adjacent member will be flexible only when bent in a direction substantially at right angles to the hinge direction. The term "rigid plastic foam" refers to those plastic foams such as are prepared from polystyrenes, polyurethanes, and the like which tend to rupture and break if a sheet of such material is bent about a radius which is approximately ten times the thickness of the sheet or smaller and yet permit some viscous flow of the polymeric material under stress. Rigid plastic foams are particularly desirable in applications where compressive strength is necessary as well as in cases where the foam constitutes an actual mechanical element of the structure and is utilized for load bearing or similar purposes.

Frequently, it would be convenient to utilize the structural benefits which can be derived from rigid foams in many applications, particularly in packaging and as cores for foamed plastic structures such as cylinders and similar geometric forms developed by bending a plane. Frequently, the bodies of rigid plastic materials having such shapes are constructed by a molding or piecing together of flat planks. Such operations are undesirable and often an inconvenience, particularly in instances where there is insufficient demand for the particular articles to warrant the use of mass production techniques in their preparation.

It is an object of the present invention to provide a method of flexibilizing a rigid plastic sheet .

It is a further object of this invention to provide an apparatus which will continuously prepare flexibilized plastic sheets.

It is another object of this invention to provide a method and apparatus which will continuously produce a flexibilized plastic sheet by continually crushing a foamed plastic sheet in one direction.

These benefits and other advantages are achieved in accordance with the invention by partially crushing a cellular or expanded plastic body in a direction generally normal to the direction of the desired flexibility.

Flexible foam plastic sheet is readily prepared by an apparatus in accordance with the invention which comprises a means to forward a foamed plastic sheet, a means to retard the forwarding of said foamed plastic sheet, said means to retard the forwarding of said plastic sheet adapted to permit the advancement of the foamed plastic sheet at a rate less than the means to advance said plastic sheet, said means to advance the plastic sheet being positioned closely adjacent to said means to retard said plastic sheet and adapted to partially crush said foamed plastic sheet between said means to advance said plastic sheet and said means to retard said sheet.

The success of the method and apparatus of the present invention appears to be based on the controlled introduction of wrinkles into the cell walls of the plastic foam without the rupturing of a significant number of the cells.

Other objects and advantages of the invention will become more apparent from the following description when taken in conjunction with the accompanying drawing wherein:

FIGURES 1, 2 and 3 represent three views of an apparatus in accordance with the invention for the flexibilizing of rigid foam plastic sheet.

FIGURES 4. 5, 6, 7, 8 and 9 depict the operation of the apparatus shown in the FIGURES 1-3.

Figure 1:
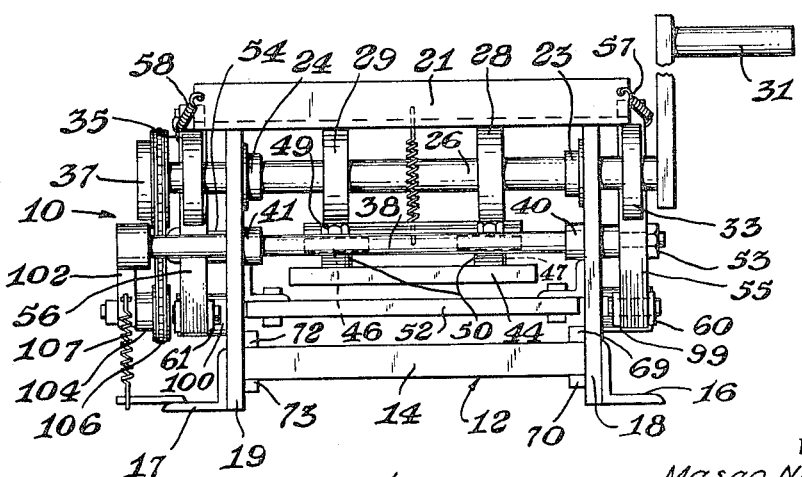
Figure 3:
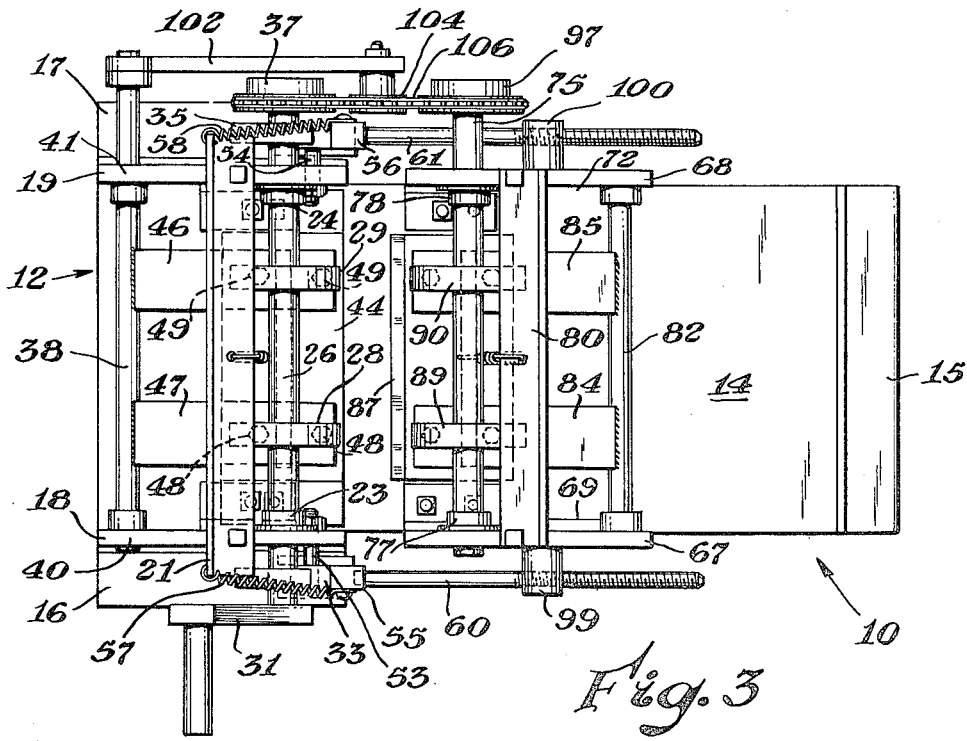
Figure 2:
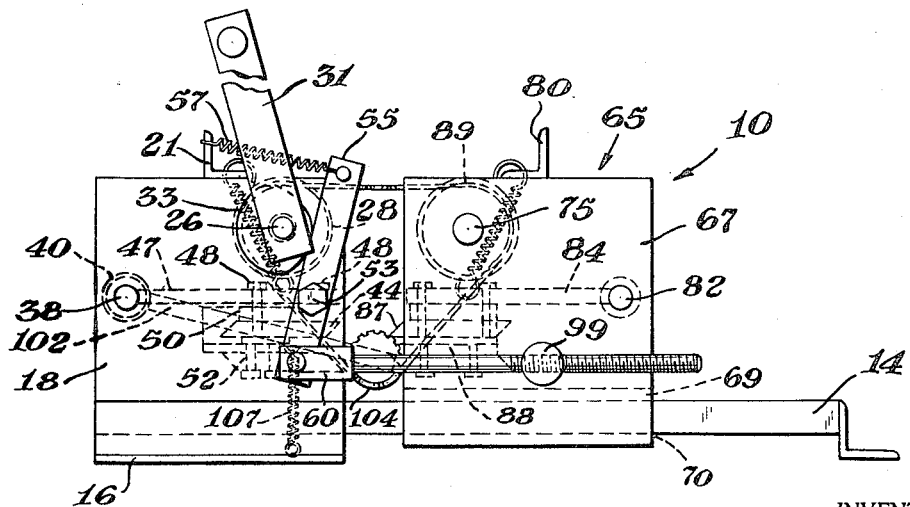

In FIGURES 1, 2 and 3, there is illustrated a rigid foam flexibilizing apparatus generally designated by the reference numeral 10. The apparatus 10 comprises a bed 12. The bed 12 is made up of a bed plate 14 having fixed thereto mounting brackets 15, 16 and 17. Mounted between the base plate 14 and the bracket 16 is a side plate 18 and mounted between the bracket 17 and the base plate 14 is an oppositely disposed side plate or bracket 19. Portions of the side plates 18 and 19 are connected to and braced by a frame member 21. Within the side plates 19 and 18 generally adjacent the brace member 21 is disposed a pair of bearing means 23 and 24, respectively. The bearing means 23 and 24 rotatably support a shaft 26, the shaft 26 in turn carries an operating cam 28, a second matched operating cam 29. The cams 28 and 29 are disposed between the side plates 18 and 19. The shaft 26 is provided with an operating means 31 and external to the side plate 18 is provided with a cam 33. Also external to the side plate 19 is mounted a positioning cam 35 adjacent to a sprocket 37. A reciprocally pivoting shaft 38 is supported from bearing 40 and 41 positioned in the side plates 18 and 19. The reciprocally pivoting shaft 38 supports a foam gripping shoe 44. The shoe 44 is connected to the shaft 38 by means of the arm members 46 and 47 and by means of the cap screws 48 and 49. The shoe 44 is spaced from the arms 46 and 47 by means of the spacers 50. Disposed immediately below and adjacent to the foam gripping shoe 44 is a stationary foam gripping shoe 52. External to the side plates 18 and 19 and mounted on the pivots 53 and 54 are disposed a pair of lever members 55 and 56, respectively. The lever members 55 and 56 are inoperative engagement with cam members 33 and 35, respectively, and are maintained in engagement therewith by means of the springs 57 and 58. The pivot points of 53 and 54 are adjustably mounted to the side plates 18 and 19, respectively, in order that the engagement between the cam 33 and the lever 53 and cam 35 and lever 55 may be varied at will. The end of the lever of 53 opposite to the end engaged by the spring 57 is pivotally connected to a push rod 60 and the lever 55 is similarly pivotally connected to a push rod 61. The push rods 60 and 61 are operatively connected to a sliding foam gripping assembly generally designated by the reference numeral 65. The assembly 65 is slidably mounted upon the base plate 14. The assembly 65 comprises a pair of side frameplates or members 67 and 68. The side plate 67 engages the bed plate 14 and is maintained in position by means of the ways 69 and 70. The side plate 68 is similarly maintained in position by means of the upper way 72 and a way 73 disposed on the opposite side of the bed plate 14. The side plates 67 and 68 are maintained in spaced relationship by means of a rotating shaft 75 which connects to the side plates 67 and 68 by the bearing means 77 and 78, respectively. Alignment of the side plates 67 and 68 is further maintained by the brace member 80 and an oscillating shaft 82. The assembly 65 is substantially similar in operation and construction to the hereinbefore described foam gripping means with the exception that it is slidably mounted on the bed 14. The shaft 82 has rigidly affixed thereto a pair of arms 84 and 85 which are in operative engagement with the reciprocating foam gripping shoe 87 and is rigidly supported between the frame members 67 and 68. A fixed foam gripping shoe 88 is disposed below shoe 87. The arms 84 and 85 are activated by a pair of cams 89 and 90, which are supported on the shaft 75. The shaft 75 further carries a sprocket 97. The assembly 65 is adjustably affixed to the actuating rods 60 and 61 by means of the rod engaging ears 99 and 100.

Pivotally supported from the shaft 38 is an arm 102 which is rotatably mounted at the end thereof, and generally parallel thereto is a sprocket gear 104. A chain 106 engages the sprockets 37, 97 and 104 by means of a chain 106. The arm 102 is resiliently urged toward the base plate 14 by means of a tension spring 107.

In operation of the apparatus shown in FIGURES 1, 2 and 3, shaft 26 is rotated by the operating means of 31 and roller chain 106 causes the sprocket 97 to rotate and, consequently, the shaft 75 with its associated cams are rotated. Cams 33 and 35 engage the operating levers 55 and 56 which, in turn, actuate the push rods 60 and 61 causing the assembly 65 to oscillate on the bed plate 14. Rotation of the cams 28 and 29 on the shaft 26 cause the foam gripping plate 44 to execute an oscillating function with respect to the oppositely disposed foam gripping plate 52. Similarly, rotation of the shaft 75 and the cams 89 and 90 cause the foam gripping plate 87 to approach and withdraw from the foam gripping plate 88.

Figure 4:
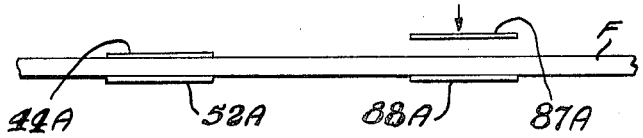

The mechanical sequence of operation is best understood by reference to FIGURES 4, 5, 6, 7, 8 and 9, wherein the sequential steps of the operation are schematically illusrated. In FIGURE 4, foam gripping jaws are schematically depicted and identified by the reference numerals 44a, 52a, 87a and 88a. A sheet of rigid foam being flexibilized is between the jaws and is designated by the reference character F. The jaws 44a and 52a (equivalent to the jaws 44 and 52 of FIGURES 1, 2 and 3) are in operative engagement with the sheet of foam material F. The jaws 87a and 88a are spaced from each other and spaced from the jaws 44a and 52a. The arrow designates that the jaw 87a is moving toward the sheet F.

Figure 5:
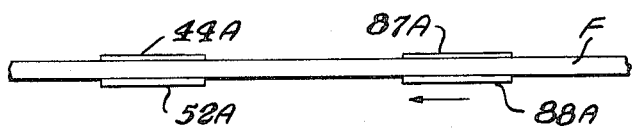

In FIGURE 5, the jaw 87a has engaged the foam F, the pair of jaws 87a and 88a gripping the foam F are moved toward the jaw pair 44a and 52a as indicated by the arrow.

Figure 6:
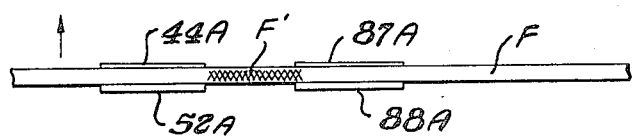
Figure 7:
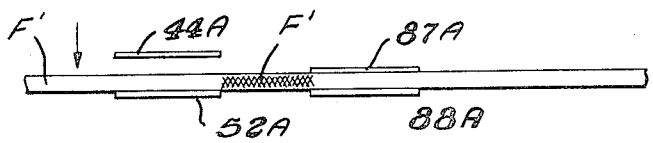

In FIGURE 6, the jaw pair 44a and 52a and the jaw pair 87a and 88a have approached each other to the limit of travel. The cross hatched portion of the foam sheet F, designated as F', represents a portion of the foam which has been longitudinally crushed. The arrow indicates the movement of the jaw 44a whereby the sheet F will be released. In FIGURE 7, the jaw 44a has released the sheet F and the portion of the sheet F' has expanded by its natural resiliency into the space between the jaw portions 44a and 52a, imparting a forwarding action to a portion of the sheet F. The arrow indicates the jaw 44a is closing upon the sheet.

Figure 8:
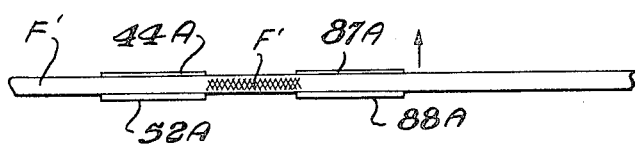

In FIGURE 8, the jaw pair 44a and 52a are shown in engagement with the sheet F in a portion of the crushed section F'. The direction of motion of the foam engaging plate 87a is illustrated by the arrow.

Figure 9:
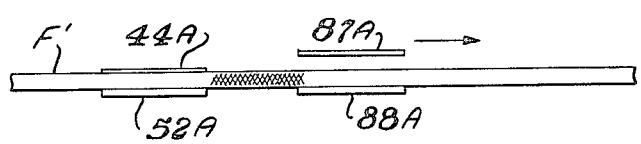

In FIGURE 9, the jaw 87a is disengaged completely from the foam sheet F and is moving toward the position of the jaws shown in FIGURE 4, whereupon the cycle is resumed.

The apparatus, as depicted in FIGURES 1, 2 and 3, receives a sheet or plank of the rigid foam plastic material and by the repetition of the steps illustrated in FIGURES 4-9 crushes it in the longitudinal direction. A plastic sheet on removal from such an apparatus is found to have been reduced in overall volume by a small amount and to have lost its beam strength in the longitudinal direction when the loading is applied normal to the major face. However, the sheet is flexible and may readily be bent about a radius which may be less than the thickness of the sheet itself. In the transverse direction, the strength of the sheet is substantially unchanged and the stiffness retained. Similarly, edge loading of a body which is crushed in accordance with the invention indicates that the strength in this direction has not been overly altered.

Figure 10:
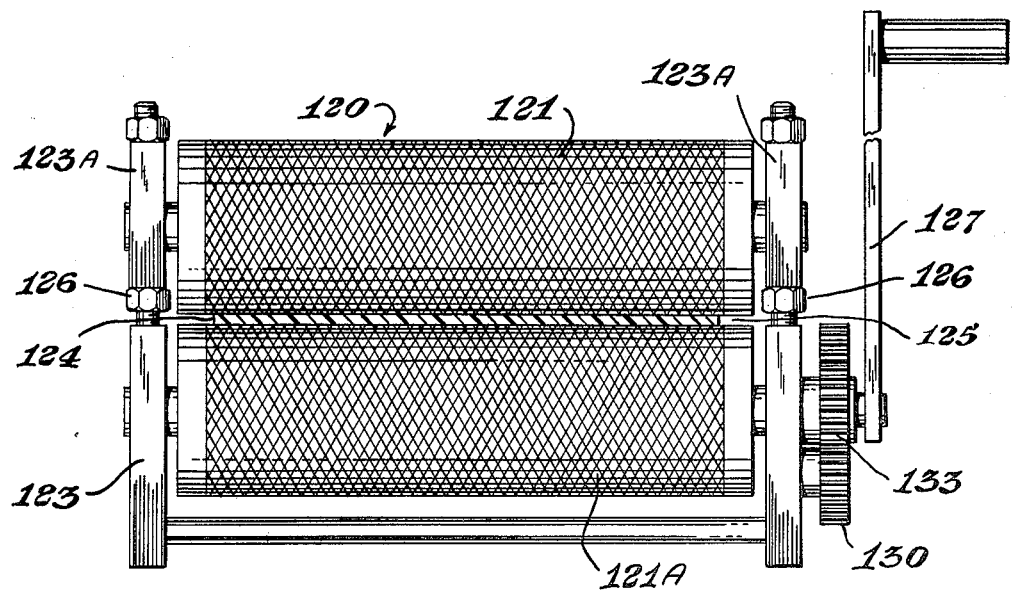
FIGURE 10 depicts a front view of an alternate embodiment of a sheet flexibilizer in accordance with the invention.
Figure 11:
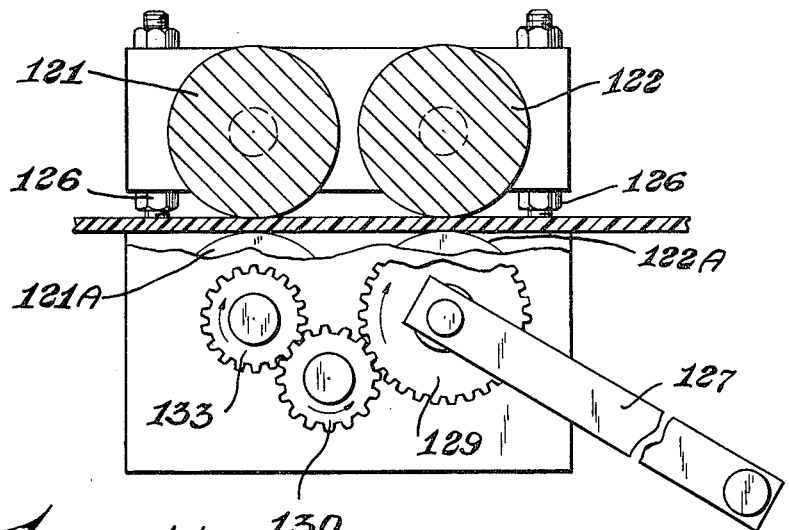
FIGURE 11 shows a partly-in-section view of the apparatus of FIGURE 10 in engagement wtih the rigid foam plastic sheet being flexibilized.

A second embodiment of the invention is illustrated in FIGURES 10 and 11. FIGURE 10 represents a front view of a foam flexibilizer and FIGURE 11 is a partly-in-section view. The foam flexibilizer is generally designated by the reference numeral 120 and comprises two pairs of spaced rolls, the rolls are 121, 121a, 122 and 122a. The rolls 121, 121a, 122 and 122a are supported by means of an adjustable frame 123 whereby the spacing 124 between adjacent rolls is readily adjusted. For this purpose, there are provided threaded spacing members 126 which serve to vary the distance between the roll centers by varying the distance between the frame parts 123 and 123a. The roll 122a is driven by a driving means 127 in the direction indicated by the arrow. A gear 129 is provided attached to the roll 122a, which, in turn, engages an idler gear 130 which is affixed to the frame 123. The idler gear 130 is in operative engagement with the gear 133 fixed to the roll 121a. The ratio between the gears 129 and 133 is such that the roll 121a is rotating in the same direction as roll 122, but at a higher surface velocity. The roll 121a, in cooperation with roll 121, serves to forward rigid foam plastic sheet introduced into the space 125 between the rolls 121 and 121a. Plastic sheet then enters the space between the rolls 122 and 122a which serves to grip the sheets and prevent any movement thereof other than that dictated by the roll surface. Cooperative action of the two roll pairs are such that a sheet entering the roll pair 121 and 121a is discharged from he rolls 122 and 122a at a rate slower than the sheet enters. This compacting action causes the foam plastic sheet to be crushed in a longitudinal direction and become flexible. The apparatus of the invention, as depicted in FIGURES 10 and 11, permits the continuous flexibilizing of rigid thermoplastic sheets without employing a reciprocating motion.

The embodiment of the invention, as illustrated in FIGURES 10 and 11, is particularly adapted to the crushing of relatively light foam plastics and those that have the relatively low bulk density and subsequently have little physical strength. If the force required to crush a sheet of foam is relatively large, the embodiment of FIGURES 1-3 is particularly advantageous as the foam engaging shoes distribute the force over a relatively large portion of the sheet surface, whereas the embodiment of FIGURES 10 and 11 is particularly adapted to handling a thinner section wherein the force per unit area of surface is relatively low compared to the crushing force. In general, the roll embodiment is particularly adapted for use with thin sheets of conventional thermoplastic foam, whereas the reciprocating embodiment is particularly advantageaus where thicker sections are utilized.

By way of further illustrating, an apparatus substantially as illustrated in FIGURES 1, 2 and 3 was employed to flexibilize a foamed polystyrene plank approximately 1 inch thick, 12 inches wide, and about 9 feet in length. The density of the polystyrene foam plank was about 2 pounds per cubic foot and the cell size approximately 1 millimeter. The plank was first passed through the apparatus, cut in half, and one portion of the plank treated a second time. The physical properties of the portion of the original plank were determined of the plank after being flexibilized in accordance with the invention after one pass and after being flexibilized twice. The results obtained with a sample to determine the changes in density, thermal conductivity and compressive strength are as follows:

| Sample A | Density, lbs./cu. ft. | Thermal + conductivity | Compressive strength, p.s.i. |
|---|---|---|---|
| Original | 1.73 | .301 | 28.6 |
| One pass | 2.15 | .282 | 29 |
| Two passes | 2.36 | .277 | 28 |

+ = B.t.u. in./ft.² hr.° F.

Treatment in accordance with the invention increases the density somewhat, reduces the thermal conductivity, and the compressive strength of the material is substantially unchanged. In order to ascertain the minimum bending radius, a plurality of samples were passed through the apparatus of FIGURES 1, 2 and 3. These samples were also polystyrene foam of about 1 millimeter cell size, 1 inch in thickness and 12 inches wide. The results are set forth in the following tabulation.

| | Density lbs./cu. ft. | Compressive strength, p.s.i. | Min. blending diameter before break, inches |
|---|---|---|---|
| Sample B: | | | |
| Original | 1.69 | 27.3 | |
| One pass | 1.78 | | |
| Two passes | 1.98 | 28.3 | 3.0 |
| Sample C: | | | |
| Original | 1.59 | 25.8 | |
| One pass | 1.76 | | |
| Two passes | 1.91 | 28.3 | 3.5 |
| Sample D: | | | |
| Original | 1.59 | | |
| One pass | 1.91 | 26 | 3.0 |
| Sample E: | | | |
| Original | 1.66 | | |
| One pass | 2.04 | 25.9 | 3.0 |

Relatively high density polystyrene foam having a thickness of about ½ inch, width of about 12 inches, and a cell size of about 0.1 millimeter was subjected to one pass through the reciprocating flexibilizer in a manner similar to the previous samples. The averaged results of several samples are as follows.

| | Density, lbs./cu. ft. | Percent shrinkage | Min. bending diameter before break |
|---|---|---|---|
| Sample F: | | | |
| Original | 3.92 | | |
| Flexified | 4.76 | 0.84 | 3′ to 4′ |
| Sample G: | | | |
| Original | 3.60 | | |
| Flexified | 3.94 | 0.34 | 3′ to 4′ |

A sample of foamed polystyrene board having a density of about 1.8 pounds per cubic foot, one-half inch thick and having a cell diameter of about 1 millimeter was passed through a flexibilizing apparatus substantially as shown in FIGURES 1, 2 and 3. The flexibilized sheet was bent through an angle of about 180°, to form a bend which had substantially no internal radius without rupturing. A sample of the board which was not flexibilized broke when bent to a radius of about 11 inches.

A further sample of a polystyrene board having a density of about 1.8 pounds per cubic foot, three-eighths of an inch thick, and having a cell size of from about 1.3 to about 0.5 millimeters was flexibilized in accordance with the invention employing apparatus generally as shown in FIGURES 1, 2 and 3. The flexified board broke when a bending radius of 0.65 inch was reached, whereas the untreated board broke when bent over a diameter of about six inches.

Similar beneficial results were obtained when foam planks below one-half inch in thickness were utilized from a rotary flexibilizer substantially as illustrated in FIGURES 10 and 11 wherein the rolls were provided with a knurled surface and had a diameter of about four inches. On passing a foam sheet through the apparatus, physical properties were found to be commensurate with those obtained with the reciprocating flexibilizer.

In a similar manner, other rigid expanded plastic sheets and bodies are rendered selectively flexible. Typical materials which may be employed are polyurethanes, polyvinyl chlorides, polyvinylidene chlorides, phenol formaldehyde and like foams. Advantageously, a somewhat spongy effect is obtained when a foam plastic sheet is first passed through a flexibilizer in accordance with the invention and subsequently is passed through a second time whereby the direction of feed is disposed at substantially right angles to the first pass. In this manner, a more flexible sheet is obtained which can, to limited degree, assume a compound curvature.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the flexibilizing of a cellular plastic cellular plastic sheet, said apparatus comprising a means to forward a cellular plastic sheet, a means to retard the forwarding of said cellular plastic sheet comprising a pair of generally opposed surfaces adapted to retract from and to engage adjacent surfaces of foam plastic sheet and while engaging the foam plastic to move relative to the means to forward the expanded plastic sheet, said means to retard the forwarding of said cellular sheet adapted to permit the advancement of the cellular sheet at a linear rate less than that of the means to advance said plastic sheet, said means to advance the plastic sheet being positioned adjacent said means to retard said plastic sheet, and so constructed and arranged so as to partially crush said plastic sheet in the plane of the sheet between said means to advance said plastic sheet and said means to retard said plastic sheet.

2. An apparatus in accordance with claim 1, wherein said means to forward a foam plastic sheet comprises a pair of generally opposed surfaces adapted to close upon and engage said foam plastic sheet and while engaging said sheet to move toward said means to retard said expanded plastic sheet.

3. An apparatus in accordance with claim 1, wherein said means to forward a foam plastic sheet comprises a pair of generally opposed surfaces adapted to retract and engage said foam plastic and while in closed position move toward said means to forward said expanded plastic sheet.

4. An apparatus for the flexibilizing of a cellular plastic sheet comprising a first pair or jaws, said jaws having opposed foamed plastic sheet gripping surfaces, a second pair of jaws having opposed foamed plastic sheet gripping surfaces, said first jaws and said second jaws being slidably disposed with respect to each other, said first jaw and second jaw each provided with jaw opening and closing means, in cooperative combination with said jaw opening and closing means a common jaw activating means adapted to close said first and second jaws upon a sheet of cellular plastic material disposed between said jaws, means to cause said first jaws and said second jaws to approach each other, means to open said first jaws, move said jaw pair to a position remote from said second jaws, means to cause said first jaws to close upon said sheet, and means to open and subsequently close said second jaws and move said first jaws toward said second jaws, the apparatus being so constructed and arranged so as to maintain the sheet in a planar configuration during the operation thereof and crash the sheet in a direction in the plane thereof.

References Cited by the Examiner

UNITED STATES PATENTS

| 1,792,316 | 2/31 | Leguillon | 18—2 |
| 1,808,525 | 6/31 | Cadden | 18—2 |
| 2,051,011 | 8/36 | Smith | 18—19 |
| 2,952,033 | 9/60 | Goodwin | 18—1 |

WILLIAM J. STEPHENSON, *Primary Examiner.*